Jan. 13, 1959      O. C. MELGAARD      2,868,102
MOUNTING STRUCTURE FOR AIR CONDITIONING APPARATUS
Filed Aug. 5, 1957      2 Sheets-Sheet 1
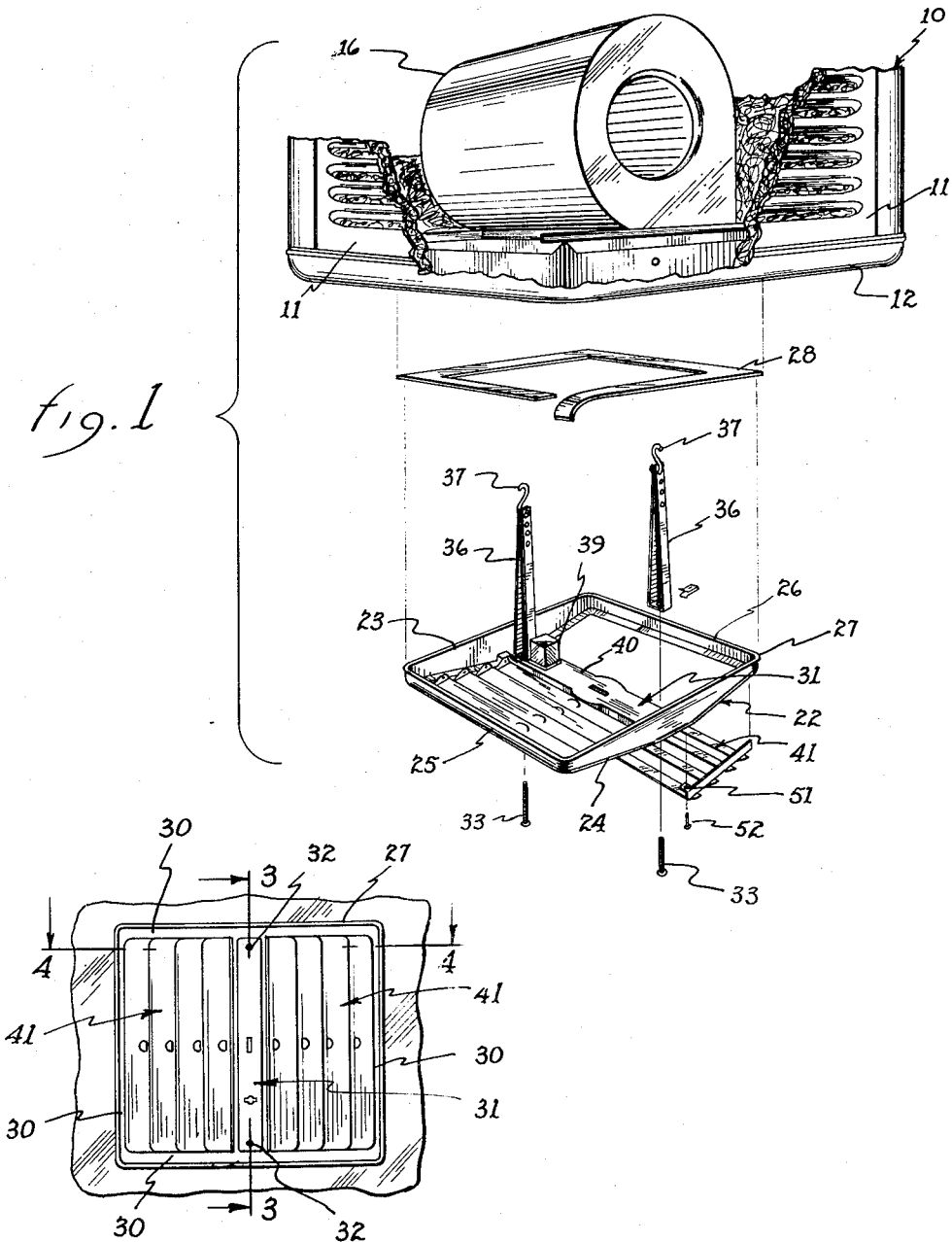
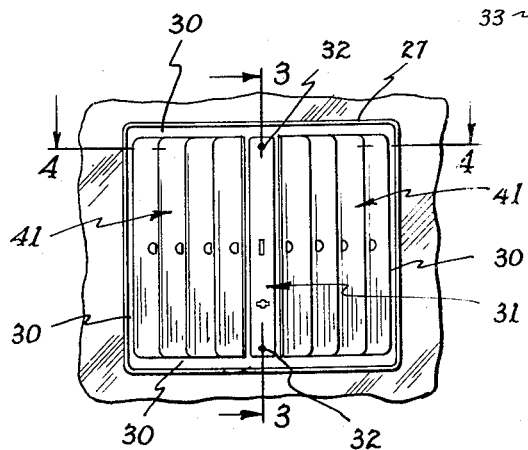
INVENTOR.
OSCAR C MELGAARD
BY
ATTORNEY Jan. 13, 1959     O. C. MELGAARD     2,868,102
MOUNTING STRUCTURE FOR AIR CONDITIONING APPARATUS
Filed Aug. 5, 1957     2 Sheets-Sheet 2

INVENTOR.
OSCAR C. MELGAARD
BY
ATTORNEY

United States Patent Office 2,868,102
Patented Jan. 13, 1959

2,868,102

MOUNTING STRUCTURE FOR AIR CONDITIONING APPARATUS

Oscar C. Melgaard, Phoenix, Ariz., assignor to Wright Mfg. Company, Phoenix, Ariz., a corporation of Arizona Application August 5, 1957, Serial No. 676,147

2 Claims. (Cl. 98—39)

This invention pertains to improvements in mounting structures for air conditioning apparatus and is particularly directed to an improved mounting arrangement for a downdraft mounting arrangement for evaporative coolers on the roof of trailers and similar installations.

One of the objects of this invention is to provide an improved mounting arrangement for a downdraft cooler which is rugged and stable in use but which may be quickly and easily installed.

Still another object of this invention is to provide means including the grille frame structure to lock a downdraft cooler on the roof structure of a trailer and the like to be air conditioned.

And a further object of this invention is to provide a mounting arrangement for a downdraft cooler which provides a large well distributed area of clamping pressure for a high degree of stability essential in applications where the vibration and jarring of road travel is present such as on the roof of a trailer.

Further features and advantages of this invention will appear from a detailed description of the drawings in which:

Fig. 1 is an exploded perspective view of a mounting structure for air conditioning apparatus incorporating the features of this invention.

Fig. 2 is a bottom view of the combined clamping and grille frame structure shown in Fig. 1.

Figure 3:
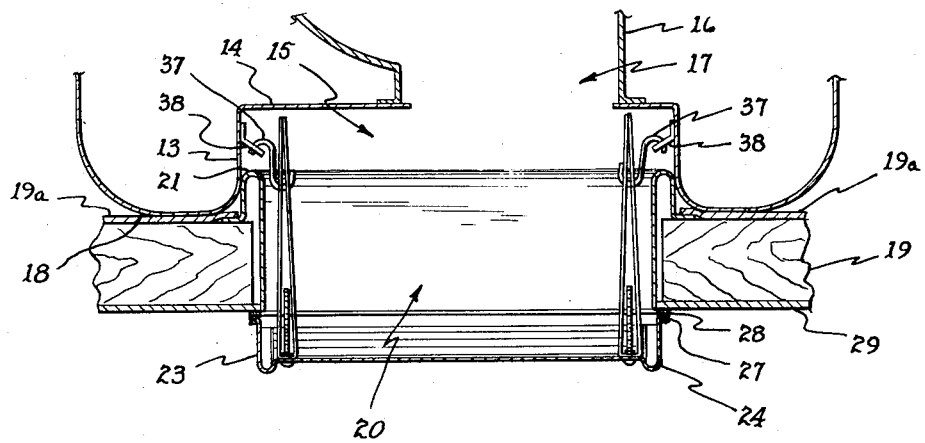
Fig. 3 is an enlarged fragmentary sectional view on the line 3—3 of Fig. 2.

As an example of one embodiment of this invention there is shown an air conditioning unit such as an evaporative cooler 10 having the usual grilled air intake sides 11 and the bottom reservoir pan 12 having a lip 13 and a cover 14 forming the downdraft discharge opening 15 for the cooler 10. The usual blower 16 having a discharge opening 17 is suitably mounted on the cover 14.

In a downdraft cooler of the aforementioned type, the bottom surface 18 of the cooler 10 rests on the top surface 19a of the roof 19, for example, of a trailer, there being provided the usual opening 20 having the lip 21 around the upper edge thereof. In an arrangement of this type it is necessary to securely clamp and hold the surfaces 18-19 between the cooler and the top together and this is complicated in the trailer type installation by the jarring and jolting of road travel and the relative thin flimsy top 19 of the trailer.

To overcome these difficulties there is provided a specially designed grille frame 22 which covers over the opening 20 and which also provides the clamp to hold the surface 18-19 together and the access means to connect and adjust the necessary controls for the proper operation of the cooler. This grille frame 22 comprises integrally connected vertically disposed sides 23, 24, 25 and 26 having a continuous upper lip 27 which is arranged to engage a suitable gasket 28 which in turn abuts against the underside surface 29 of the top 19. The sides 23, 24, 25 and 26 each terminate at their lower edges in in-turned flanges 30 and formed integrally with the in-turned flanges of the opposite sides 23 and 24 is the cross member 31 in which is formed holes 32 through which pass screws 33 which in turn are threadedly connected at 34 with the lower end 35 of the hanger straps 36 the upper ends of which are connected by S-hooks 37 to clips 38 fixed to the inside surfaces of the lips 13 of the cooler opening 15. Thus, when screws 33 are tightening the grille frame is clamped up against the top 19 with the entire lip 27 pressing against the underside surface 29 of the top, so as to pull the cooler surface 18 securely against the roof surface 19 which distributing the clamping pressure around the entire lip 27 of the frame against the surface 29. This wide distribution of clamping pressure on the relatively light and flimsy top 19 provides great stability and security for the cooler on the trailer top, especially during road travel.

Figure 4:
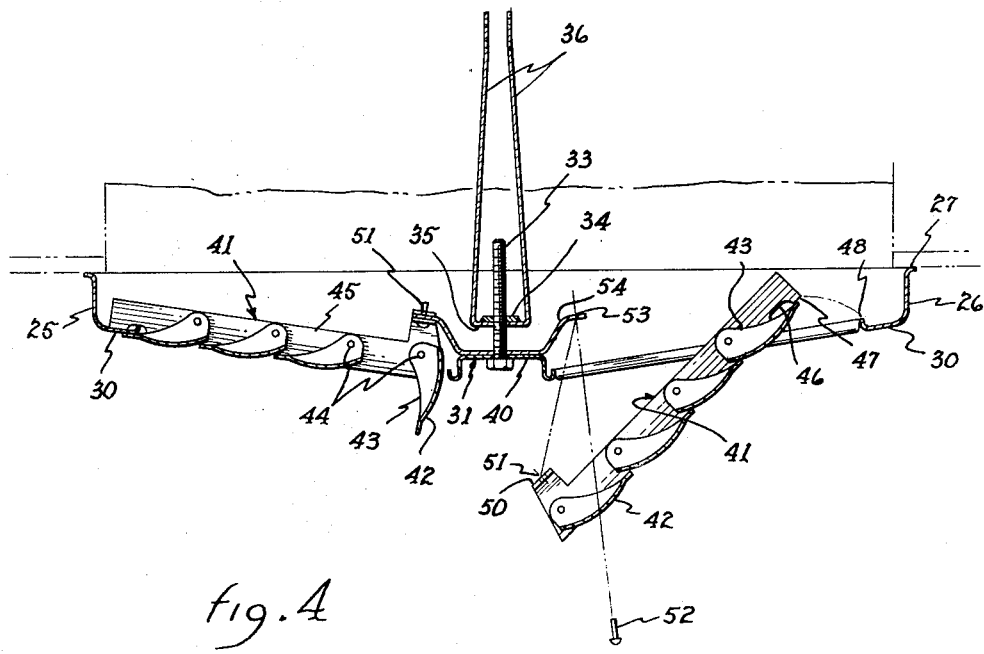
Fig. 4 is an enlarged sectional view on the line 4—4 of Fig. 2.

With the cooler securely clamped up as described, access to the cooler interior for connecting power supply leads from the motor (not shown) to the control devices, such as control switch 39 mounted on the top surface 40 of the cross-member 31 is provided by demountable louver frame units 41 each side of the cross-member 31. Each of these louver frame units 41 comprises a series of louvers 42 having turned up end flanges 43 pivotally connected at 44 to the side frames 45. Each of these side frames 45 has a notch 46 and an abutment surface 47 which hooks over the up-turned edge 48 of the inturned flanges 30, as best seen in Fig. 4. The ends of the side frames adjacent the cross-member have upstanding lugs 49 having turned-over ends 50 having holes 51 therein through which pass screws 52 which threadedly engage the outer ends 53 of the shallow U-shaped clamp pieces 54 fixed to the top surface 40 of the cross-member 31. As best seen in Fig. 4, the louver frame units 41 may be removed for access into the openings 20 and 15 for installation and adjustment purposes while the main grille frame is in fully clamped up holding position, the louver frame units being easily placed in position on the frame 22 as shown after work has been completed in the cooler. Thus a highly stable mounting structure with easy accessibility for installation, repair, and adjustment of the cooler has been provided.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein. Having thus fully set forth and described this invention what is claimed and desired to be obtained by United States Letters Patent is:

1. In combination in a mounting structure for an air conditioning apparatus comprising a cooler housing having a mounting surface adapted to engage the outside of a structure to be air conditioned, said structure including an opening aligned with a blower discharge opening in said cooler housing, a grille frame adapted to engage the inside of said structure to be air conditioned around said opening therein, a cross member forming an integral part of said frame, a clamping means located in said opening, means connecting said clamping means to said cooler housing, means connecting said clamping means to said cross member whereby tightening of said clamping means permanently clamps said cooler housing rigidly to the outside of said structure to be air conditioned and said frame rigidly to the inside of said structure to be air conditioned, and demountable louvers in said rigidly fixed frame each side of said cross-member removable to provide access to manipulate said clamping means.

2. In a mounting arrangement for an air conditioning apparatus comprising, a cooler housing having a mounting surface adapted to engage an outside surface adjacent an opening in a chamber to be airconditioned and having a blower discharge opening aligned with said opening in said chamber, a means to secure said cooler in permanent rigid position on said chamber by an operator working solely from inside said chamber comprising, a grille frame having a peripheral abutment surface facing toward said mounting surface adapted to engage an inside surface adjacent said opening in said chamber, an integral cross-member in said frame, a clamping device located in said opening in said chamber, means connecting one end of said clamping device to said cooler housing, means connecting the other end of said clamping device to said cross-member whereby tightening of said clamping device moves said mounting surface of said cooler housing toward said peripheral abutment surface of said grille to positively rigidly clamp said cooler housing to said chamber, and demountable louvers on said frame each side of said cross-member removable to provide access through said frame to connect said clamping device to said cooler housing and said cross-member and for tightening up said clamping device to rigidly secure said cooler housing and frame on said chamber to be air conditioned.

References Cited in the file of this patent

UNITED STATES PATENTS

| | | |
|---|---|---|
| 988,496 | Obermann | Apr. 4, 1911 |
| 1,879,072 | Butterfield | Sept. 27, 1932 |
| 2,500,527 | Demuth | Mar. 14, 1950 |
| 2,780,981 | Miller | Feb. 12, 1957 |
| 2,789,494 | Goettl et al. | Apr. 23, 1957 |

FOREIGN PATENTS

| | | |
|---|---|---|
| 59,554 | Denmark | Feb. 23, 1942 |